SOLDER STRIPING APPARATUS

Filed Feb. 23, 1966 2 Sheets-Sheet 1

June 25, 1968 T. E. GANNOE 3,389,683

SOLDER STRIPING APPARATUS

Filed Feb. 23, 1966 2 Sheets-Sheet 2

INVENTOR.
THOMAS E. GANNOE

BY Robert E. Strauser
ATTORNEY 3,389,683
SOLDER STRIPING APPARATUS
Thomas Earl Gannoe, Warren, Pa., assignor to Sylvania Electric Products Inc., a corporation of Delaware
Filed Feb. 23, 1966, Ser. No. 529,503
5 Claims. (Cl. 118—69)

ABSTRACT OF THE DISCLOSURE

Apparatus for continuously applying to a parent strip a stripe of solder of sufficient thickness to allow an electrical connection to be made thereto when the strip is subsequently formed into individual electrical connectors. Means are provided for continuously abrasively cleaning the strip, chemically cleaning the strip and for accurately fluxing and applying the layer of solder thereto.

This invention relates to electrical contacts and more particularly to apparatus for manufacturing parent strip which is advantageously employed in greatly enhancing the production and subsequent utilization of electrical contacts.

Sophisticated electronic equipment now in use utilizes many thousand of electrical connections between various circuits. These connections may be between pairs of electrical contacts; between an electrical contact and a printed circuit board; or between an eletrical contact and a wire. To complete the latter form of connection two methods now in use are wire wrap and solder. Of these the solder connection is generally the best as it is most resistant to shock and to the build-up of adverse electrical characteristics because of oxidation of the materials involved. It is with the solder type of connection that this invention is concerned.

As mentioned above, the highly sophisticated electronic equipment in use today, such as computers and the like, utilize many thousands of miniature electrical contacts. While these contacts are now, for the most part, manufactured automatically, and even assembled into connector blocks automatically, the final connection of a wire to the terminal portion of these contacts is usually made by hand. In the case of a solder connection, this involves preparing the terminal for the reception of the solder, which usually involves the application of a solder flux to the area and may include an abrasive or physical cleaning and/or a chemical cleaning or degreasing of the area before flux is applied, positioning a wire with respect to the terminal portion, applying solder to the area and heating to complete the connection. These operations are time consuming and difficult to perform as they generally are done in a restricted area.

Therefore, it is an object of this invention to enhance the manufacture of electrical contacts.

It is another object of this invention to reduce the cost of making connections to electrical contacts.

It is still another object of the invention to provide an electrical contact having a terminal area provided with a predetermined amount of solder.

Yet another object of the invention is the provision of apparatus for fabricating parent strip for subsequent utilization in the manufacture of electrical contacts.

Still another object of the invention is the provision of apparatus for applying a solder layer to a nickel surface.

These objects are achieved, in one aspect of the invention by the provision of apparatus for fabricating parent strip. The apparatus includes a supply of base material and a plurality of stations through which the strip is passed and whereat flux is applied and solder is subsequently applied to a predetermined area and in a predetermined amount.

For a better understanding of the present invention, together with other and further objects, advantages, and capabilities thereof, reference is made to the following disclosure and appended claims in connection with the accompanying drawings in which:

Figure 1:
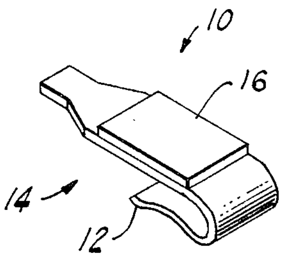
FIG. 1 is a perspective view of one type of electrical contact that may be formed by employing the teaching of this invention.

Referring now to the drawings with greater particularity, in FIG. 1 there is shown, by way of example only, an electrical contact 10 having a contact point area 12 and a terminal portion 14. The terminal portion 14 is provided with a predetermined amount of solder 16, this amount being sufficient to allow a wire or other connector to be joined thereto without the application of additional solder.

Employing contacts of this type allows an operator on an assembly line to position a wire on the terminal portion and effect adherence to the contact by the application of heat alone. This greatly reduces the time involved in making soldered connections and greatly improves the quality of the bond since the proper amount of solder is automatically present and is no longer at the discretion of the operator.

Figure 2:
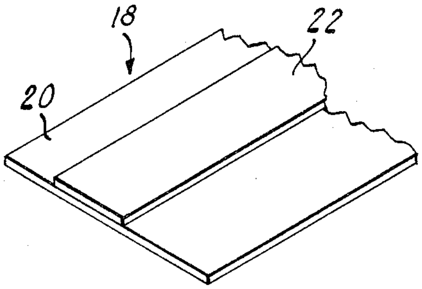
FIG. 2 is a perspective view of a section of parent strip formed by the apparatus of this invention.

Contacts of the type shown in FIG. 1 are best formed from parent strip 18 such as is shown in FIG. 2. Here the parent strip 18 comprises a base material 20 which has applied thereto, in a predetermined area, a layer of solder 22.

Figure 3:
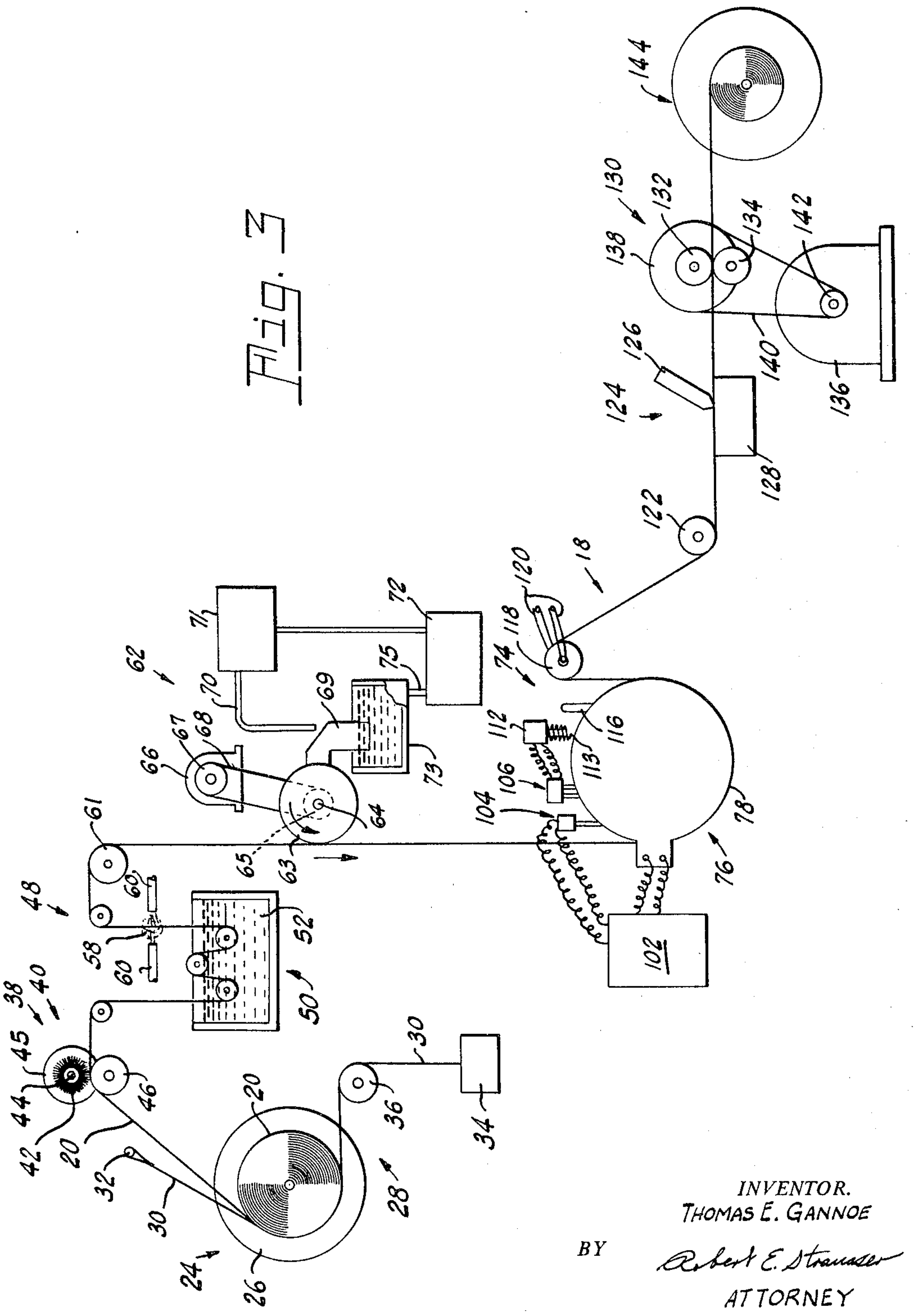
FIG. 3 is a diagrammatic elevational view of apparatus for fabricating the strip of FIG. 2.

Apparatus for fabricating parent strip is shown diagrammatically in FIG. 3. While this apparatus may apply solder to any material capable of accepting solder it is perhaps best explained in connection with a material that is inherently difficult to solder, such, for example, as nickel. The material in this instance is berillium-copper strip that is flashed with nickel. The berillium-copper base material 20 is fed from a supply thereof 24 which may comprise a reel 26. Means 28 is provided for retarding any overspin of the reel and for keeping tension on base material 20. The retarding means shown comprises a strap 30 which is fixed at a point above the reel, as at stud 32, and which is formed to engage the body of the material 20. Tension is supplied to strap 30 by weight 34 which depends therefrom. The strap 30 passes over an idler 36 which is positioned between stud 32 and weight 34, and, as is obvious from FIG. 3, the position of idler 36 determines the circumferential extent of the frictional contact between strap 30 and base material 20.

A physical strip cleaning station 38 is positioned along the path of the strip and comprises an abrasive cleaning unit 40 such as a wire brush 42. The brush is mounted on a shaft 44 of motor 45 and is rotated in a direction opposite to the travel of the strip. If it be desired, mask means (not shown) may be provided between brush 42 and its associated idler 46 so that only the area to which solder will be applied will be cleaned.

After the physical cleaning the base material 20 is chemically cleaned as at 48. The chemical cleaning is accomplished by a degreasing appaartus 50 comprised of a reservoir 52 of a suitable solvent. The strip is cleaned by passing it through the solvent in any suitable manner, one of which is shown in FIG. 3. Immediately beyond the chemical cleaning station 48 is positioned strip drying means 56 which may comprise air streams 58 from nozzles 60 which are connected to a suitable source of supply (not shown). The reason for the strip drying will be explained hereinafter.

The dried material leaves the chemical cleaning station, passes over idler 61, and enters the solder flux applying station 62 where is provided flux applying means comprising a flux carrying wheel 63 of a suitable material, such as rubber, in contact with strip 20 and mounted on a shaft 64 having at its opposite end a pulley 65. Drive means in the form of motor 66, drive pulley 67 and belt 68, which is connected to pulley 65, is provided to drive the wheel 63 at the same speed and in the same direction as strip 20. Wheel 63 has a width such that the flux applied to strip 20 has the width of the solder layer to be applied. Also, the flux must be of substantially uniform thickness for reasons to be explained hereinafter. The flux is applied to wheel 63 by a felt wick 69 which is positioned thereagainst. The wick 69 is wetted by a more or less continuous drip of flux thereon from hose 70 which is connected to a pump 71. The basic supply of the flux is contained in a reservoir 72, from which pump 71 draws its supply, and a further, or secondary reservoir 73 may be provided under wick 69 to catch excess flux and also to maintain the wick 69 in a wetted condition by submerging the bottom thereof in flux. A hose 75 connects the secondary flux supply 73 to the basic supply 72.

Figure 4:
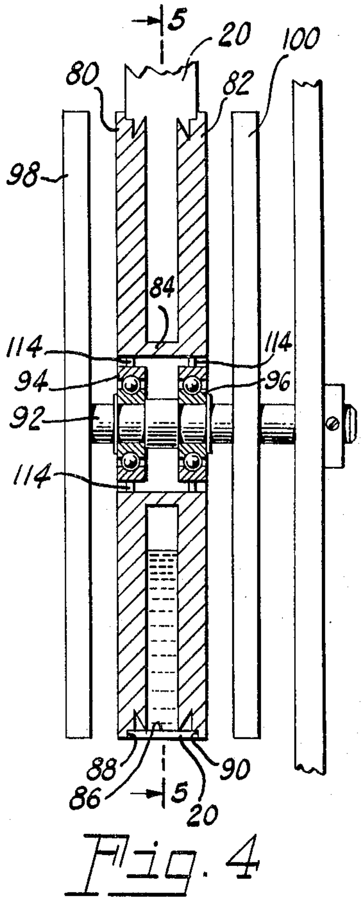
FIG. 4 is a sectional view of the solder applying station of the apparatus taken along a line 4—4 of FIG. 5.

The properly fluxed material 20 then enters the solder applying station 74 where there is provided solder applying means 76 which is formed to provide a reservoir 78 for molten solder. The reservoir or solder wheel comprises spaced apart, circular walls 80, 82 joined together by a central hub 84. The base of the reservoir is formed by the upper surface 86 of base material 20 as may be seen in FIG. 4. The spacing between walls is determined by the final width of the solder layer being applied and is substantially equal thereto. Suitable notches or grooves 88, 90 are formed in the periphery of the walls and engage the edges of material 20. The reservoir is mounted for rotation about a shaft 92 in substantially frictionless manner by means of bearings 94, 96 and it is rotated by virtue of its contact with the base material 20. Heating elements 98, 100 are positioned adjacent walls 80, 82 and serve to keep the solder at the proper application temperature via heat control means 102 and thermostat 104 which is immersed in the molten solder. Additional heating means may also be provided within shaft 92 when deemed necessary.

The reason behind drying the material 20 after degreasing and for applying the flux only to the area to which the solder is to be applied is because of the difficulty in applying solder to nickel. While the spacing of the walls 80, 82 helps in determining the width of the solder layer, when the base material is a nickel coated material the flux width is equally important. It has been found that, regardless of the tightness of the seal between the wheel and the base material 20, if the flux width is greater than the width of the wheel spacing the solder will flow under the wheel and adapt itself to the configuration of the flux.

Likewise, if the flux width is less than that of the wheel the unfluxed area will not accept the desired solder bond. This dependability of the solder width on the flux width is also the reason for drying the material after degreasing, i.e., to keep the flux from spreading beyond the desired area.

Figure 5:
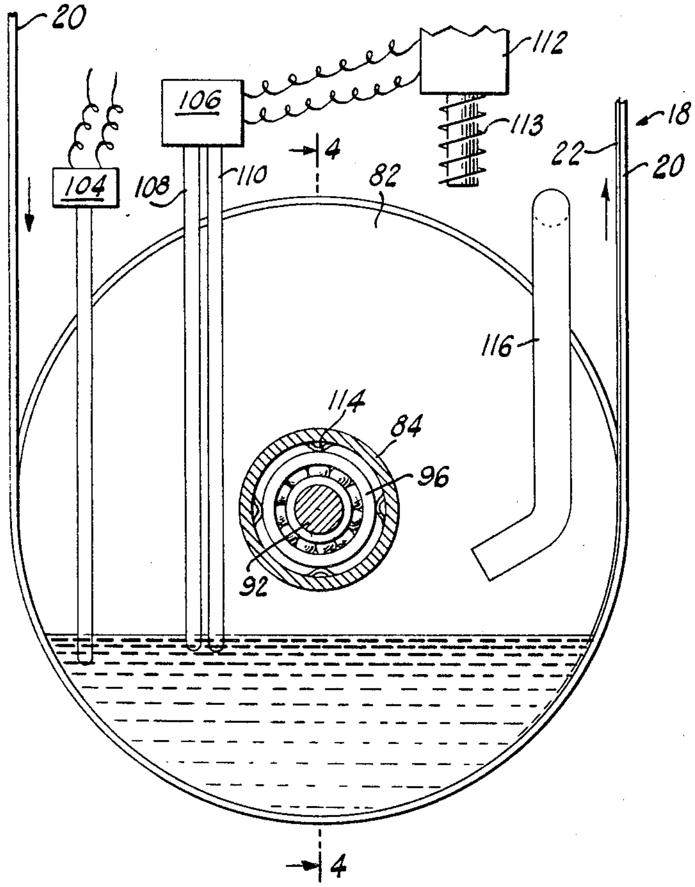
FIG. 5 is a sectional view of the solder applying station taken along the line 5—5 of FIG. 4.

Since, as is obvious from FIG. 5, the solder level must be maintained below the points of tangency made by the material with the solder wheel, solder level indicating means 106 is provided and may comprise a pair of spaced electrodes 108, 110 that function as a switch. The switch is part of a circuit that controls a solder feed device 112. When the solder level drops below the electrodes 108, 110 a relay is actuated which signals feed device 112 to add solder. The solder in the feed device may be in the form of wire or pellets or some other solid form, but it is important to heat the solder to approximately the temperature of the molten pool before adding since, if the temperature is substantially lower, the temperature of the pool will be lowered and imperfections will appear in the solder layer being applied to the strip. This may be accomplished by passing the wire from feed device 112 through a heating coil 113.

Because it is necessary that the solder wheel 78 remain capable of free and unrestrained movement even when subjected to temperatures in the range of 500° F., it is preferred that the materials used for the wheel and bearings have a relatively low coefficient of expansion. Tungsten-carbide has been found to be acceptable for this purpose. To further insure against binding caused by expansion due to heat, the bearings 94, 96 are spring loaded, as by springs 114 (see FIG. 4).

To retard the formation of dross, the presence of which could seriously detract from the final product, the upper surface of the solder pool contained in solder wheel 78 is continuously bathed in a reducing medium such as nitrogen. The nitrogen may be piped from a suitable source and discharged in the solder pool area via nozzle 116.

Upon leaving the solder wheel 78, the material 20 with its applied solder layer is passed over a cooling wheel 118 having water piped therethrough as by hoses 120.

From the water cooled wheel 118 the strip passes under an idler 122 and then to a skiving station 124 where there is provided a skiving tool 126 and a support 128 for the strip. The skiving tool 126 pares away excess thicknesses of solder and brings the solder layer thickness to its final tolerance. It is to be noted that the amount of solder necessary for making a joint may be controlled accurately enough for many purposes by the speed of the strip; however, when the strip is being used for the manufacture of miniature contacts a closer tolerance is required to permit utilization of the strip in the electrical contact forming dies.

The drive mechanism 130 is positioned adjacent the skiving station and comprises a drive wheel 132 and associated idler 134. The drive wheel is connected to a variable speed motor 136 by means of pulley 138, belt 140 and motor pulley 142.

From the drive wheel arangement the now formed parent strip may be collected on a reel 144 as shown or it may be fed directly into an electrical contact forming apparatus.

There has thus been provided by this invention a means for vastly improving the utilization of electrical contacts by the provision of parent strip forming apparatus.

Contacts may be made having just the correct amount of solder applied thereto resulting in improved connections.

Because the solder is already in proper position an operator may connect a wire thereto by merely positioning the wire and applying heat, resulting in a saving of time and material and also in cost.

Further, an improved apparatus has been provided for accurately applying solder to previously difficult to solder materials, such as nickel.

While there has been shown and described what is at present considered the preferred embodiment of the invention, it will be obvious to those skilled in the art that various changes and modifications may be made therein without departing from the scope of the invention as defined by the appended claims.

What is claimed is:

1. In the manufacture of electrical contacts from parent strip; the subcombination comprising: an apparatus for fabricating said parent strip from electrically conductive base material, said apparatus comprising: a continuous supply of said base material; means for feeding said base material through a plurality of stations; means for retarding travel of said base material cooperating with said means for feeding said base material to provide a constant tension thereto; means for abrasively cleaning at least a predetermined area of said base material, said area having a width less than the width of said base material and said abrasively cleaning means rotating in a direction opposite to the direction of travel of said base material; means for chemically cleaning said base material; means for drying said material; means for applying flux to only said predetermined area of said material; and means for applying a layer of solder only to said fluxed area.

2. The apparatus of claim 1 wherein said means for applying said layer of solder comprises a rotatable, substantially circular, hollow receptacle containing solder: the base of said receptacle being formed by said strip; said receptacle having sides, the inside edges of which define a solder applying area having a width equal to said predetermined fluxed area; and heating means for keeping said solder in a molten state.

3. The apparatus of claim 2 wherein means is provided for varying the speed of said strip, said speed controlling the thickness of the solder layer being applied.

4. The apparatus of claim 3 wherein additional means are provided for cooling said strip after said solder is applied.

5. The apparatus of claim 4 wherein the thickness of the applied solder, in the finished contact, is sufficient to allow a solder connection to be made thereto without the application of additional solder material.

References Cited

UNITED STATES PATENTS

| | | | |
|---|---|---|---|
| 2,382,236 | 8/1945 | Laxo | 118—74 |
| 2,761,416 | 9/1956 | Carlson | 118—415 X |
| 2,938,494 | 5/1960 | Wampler et al. | 118—74 |
| 3,117,030 | 1/1964 | Jons et al. | 118—415 X |
| 3,289,241 | 12/1966 | Garrison et al. | 8—415 X |

CHARLES A. WILLMUTH, *Primary Examiner.*

JOHN P. McINTOSH, *Assistant Examiner.*